United States Patent
Twitchell et al.

(10) Patent No.: US 9,882,855 B1
(45) Date of Patent: Jan. 30, 2018

(54) INSTANCE MESSAGING SERVICE

(71) Applicant: Amazon Technologies, Inc., Seattle, WA (US)

(72) Inventors: Steven Merlin Twitchell, Renton, WA (US); Emily Grace Aimette Freebairn, Seattle, WA (US); Amjad Hussain, Bellevue, WA (US); Sivaprasad Venkata Padisetty, Bellevue, WA (US); Manivannan Sundaram, Bothell, WA (US); Aaron Jeremiah Sheldon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 14/725,364

(22) Filed: May 29, 2015

(51) Int. Cl.
  *G06F 15/16* (2006.01)
  *H04L 12/58* (2006.01)
  *G06F 9/455* (2006.01)

(52) U.S. Cl.
  CPC .......... *H04L 51/24* (2013.01); *G06F 9/45558* (2013.01); *G06F 2009/4557* (2013.01); *G06F 2009/45595* (2013.01)

(58) Field of Classification Search
  CPC ............... H04L 51/24; G06F 9/45558; G06F 2009/4557; G06F 2009/45595
  See application file for complete search history.

(56) References Cited

U.S. PATENT DOCUMENTS

| | | | | |
|---|---|---|---|---|
| 2006/0224750 A1* | 10/2006 | Davies | ................ | H04L 12/587 709/229 |
| 2011/0270928 A1* | 11/2011 | Kung | ................ | H04L 67/1097 709/205 |
| 2013/0143522 A1* | 6/2013 | Rege | ................ | H04W 4/26 455/405 |
| 2013/0165185 A1* | 6/2013 | Guo | ................ | H04M 1/57 455/566 |
| 2014/0026133 A1* | 1/2014 | Parker | ................ | G06F 9/5083 718/1 |
| 2014/0260642 A1* | 9/2014 | Goel | ................ | H04B 11/00 73/658 |
| 2015/0029200 A1* | 1/2015 | Khosa | ................ | G06F 9/00 345/522 |
| 2015/0074221 A1* | 3/2015 | Kuparinen | ................ | H04L 29/12066 709/214 |

(Continued)

*Primary Examiner* — Richard G Keehn
(74) *Attorney, Agent, or Firm* — Klarquist Sparkman, LLP

(57) ABSTRACT

A method for communicating messages between a service and a virtual machine instance may include receiving a message from a service. The message includes a target instance identification of at least one virtual machine instance (VMI) to receive the message. A notification of the message and the target instance identification is stored in a message queue for each of a plurality of host servers associated with a plurality of VMIs. The message is stored in a message store without storing at least a portion of the message in the message queue. A request for undelivered messages is received from a VMI associated with a customer account. In response to the request, it is determined that a local cache contains an indication that the message is undelivered, where the local cache is within at least one of the plurality of host server computers associated with the VMI sending the request.

19 Claims, 12 Drawing Sheets

(56) References Cited

U.S. PATENT DOCUMENTS

| | | | |
|---|---|---|---|
| 2015/0106869 A1* | 4/2015 | Cabrera | G06F 21/6218 726/1 |
| 2015/0121451 A1* | 4/2015 | Giguiere | H04L 63/20 726/1 |
| 2015/0355924 A1* | 12/2015 | Hoila | G06F 9/45558 718/1 |
| 2016/0080474 A1* | 3/2016 | Argenti | H04L 67/10 709/201 |

* cited by examiner

US 9,882,855 B1

INSTANCE MESSAGING SERVICE

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs. Therefore, the computing resources, such as the host server computers, in the cloud computing environment need to be configured optimally. However, configuration of computing resources in the cloud environment can be challenging.

For example, some cloud computing or virtual server environments provide a number of pre-defined categories of computing resources for customer selection and use for running one or more virtual machine instances. However, communication between such instances or between one or more services of the cloud computing or virtual server environments and the virtual machine instances may not be easily scaled to capacity and may be characterized by high-latency communication links.

BRIEF DESCRIPTION OF THE DRAWINGS

Various embodiments in accordance with the present disclosure will be described with reference to the drawings, in which.

DETAILED DESCRIPTION

A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment. As used herein, the terms "virtual machine" and "virtual machine instance" are interchangeable.

The following description is directed to techniques and solutions supporting creating an instance messaging service for communicating messages between a service and a virtual machine instance in a service provider environment. More specifically, an instance messaging service may be implemented within a service provider environment for communicating messages and replies between one or more services (or upstream clients) and one or more virtual machine instances (VMIs) (or downstream clients) running on one or more host server computers. For example, the upstream client may use a message initiation service (MIS) (and a corresponding MIS application programming interface, or API) to send messages to the VMIs. Downstream clients (such as configuration agents running on the instances) will receive the messages from a message delivery service (MDS) using, e.g., long-polling queries. The MIS and the MDS may use one or more host server computers to facilitate the communication of messages, as explained herein below, so that a secure, low per-message latency, and scalable instance messaging service may be implemented. As user herein, the term "service provider" (or "service provider environment") can include a distributed computing environment (e.g., provider environment for cloud computing services as well as on-premises service).

Figure 1:
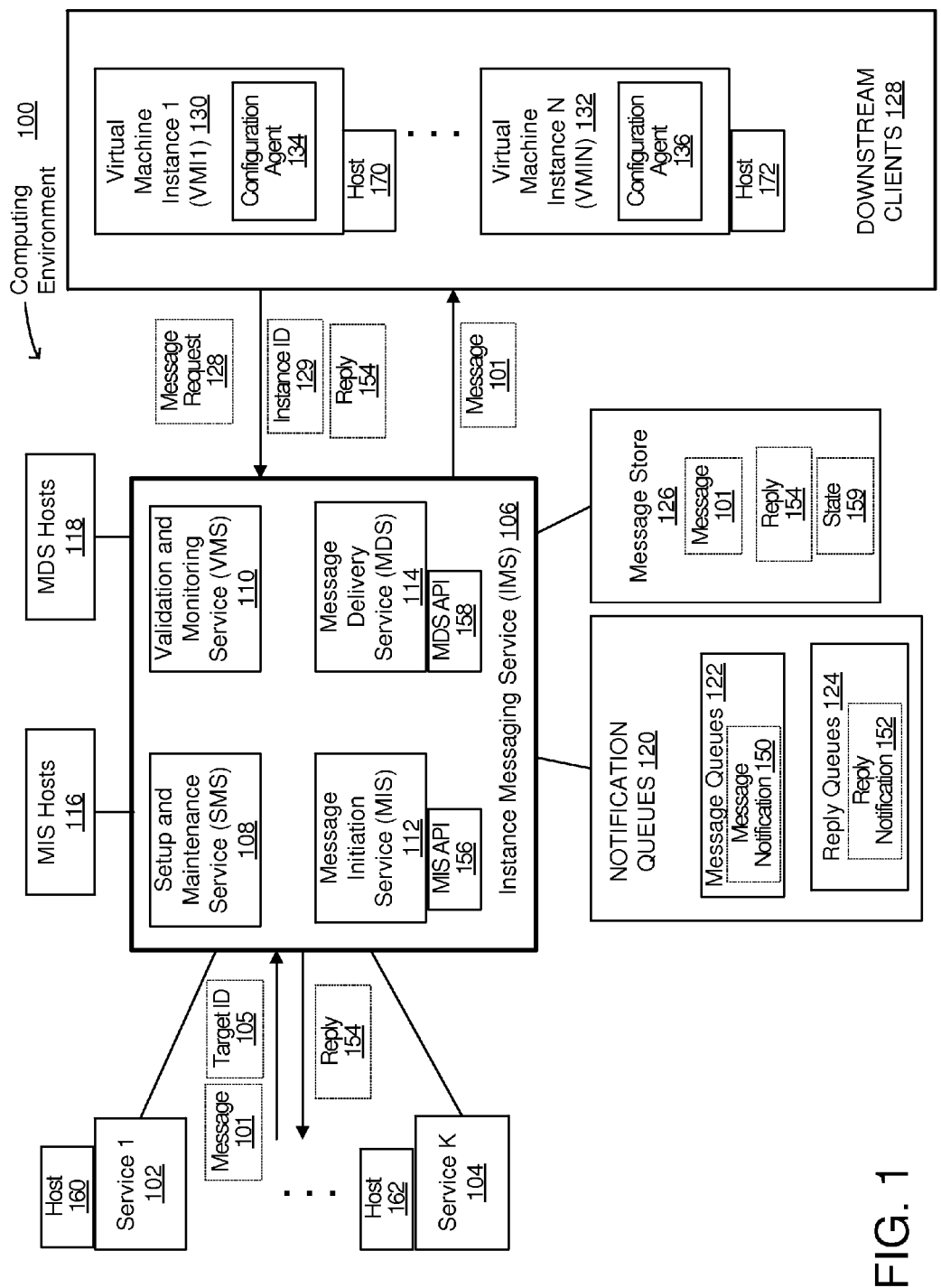
FIG. 1 is a diagram of an example service provider environment supporting instance messaging between one or more services and at least one virtual machine instance, in accordance with an embodiment of the disclosure.

FIG. 1 is a diagram of an example service provider environment supporting instance messaging between one or more services and at least one virtual machine instance, in accordance with an embodiment of the disclosure. Referring to FIG. 1, the computing environment 100 may be a multi-tenant cloud network environment where one or more clients may run one or more virtual machine instances (VMIs) on one or more of server computers (e.g., instances 130, ..., 132 running on corresponding server computers 170, ..., 172 and designated as downstream clients 128). The server computers (e.g., 170, ..., 172) may be, for example, client servers operated by (or on behalf of) one or more clients of the computing environment 100. Each of the VMIs 130, ..., 132 may execute corresponding configuration agents 134, ..., 136. The configuration agents 134, ..., 136 may comprise suitable logic, interfaces, and/or code and may be operable to manage message and reply communications between the VMIs 130, ..., 132 and the services 102, ..., 104 via the instance messaging service 106. In an example embodiment, the configuration agents 134, ..., 136 may run as applications on the corresponding instances 130, ..., 132. The computing environment 100 may be a distributed computing environment, which includes a cloud service environment and/or on-premises service environment. For brevity, the environment 100 is referred to as "service provider 100" or "service provider environment 100" herein below.

The service provider 100 may provide one or more services, such as services 102, . . . , 104, which may be running using corresponding host server computers 160 . . . 162. In one embodiment, example services 102, . . . , 104 may include a backup service (e.g., for backing up one or more customer VMIs), a configuration service (e.g., for configuring one or more of the VMIs 130, . . . , 132), a storage service, and so forth.

The service provider environment 100 may further comprise an instance messaging service 106. The instance messaging service 106 may comprise suitable logic, circuitry, interfaces, and/or code and may be operable to provide messaging functions for purposes of communicating messages and replies between the upstream clients (e.g., the services 102, . . . , 104 running on hosts 160, . . . , 162) and the downstream clients 128 (e.g., the VMIs 130, . . . , 132 running on hosts 170, . . . , 172 respectively). The instance messaging service may include a setup and maintenance service (SMS) 108, a validation and monitoring service (VMS) 110, a message initiation service (MIS) 112, and a message delivery service (MDS) 114. The MIS 112 may be implemented using one or more host server computers, such as MIS hosts 116. Similarly, the MDS 114 may be implemented using MDS hosts 118. The instance messaging service (IMS) 106 may also use one or more notification queues 120, which may be implemented as cache (or another type of memory or storage) within one or more of the hosts 116-118. The IMS 106 may further use a message store 126, which may be a network storage device or a database.

Even though the hosts 116-118, the notification queues 120 and the message store 126 are illustrated as being separate from the IMS 106, the disclosure may not be limited in this regard and one or more of these modules may be implemented within the IMS 106. In accordance with an example embodiment of the disclosure, the IMS 106 may be implemented as a stand-alone service within the service provider 100 (as illustrated in FIG. 1) or it may be implemented as a code library (i.e., software) within one or more of the server computers (e.g., 160, . . . , 162, and 170, . . . , 172).

The Message Initiation Service (MIS) 112 may comprise suitable circuitry, interfaces, logic and/or code and may be operable to initiate a two-way conversation with one or more of the instances 130, . . . , 132. Clients (e.g., one or more of the services 102, . . . , 104) can send messages to the VMIs 130, . . . , 132 and receive replies either synchronously or asynchronously. In an example embodiment, the MIS 112 may use a separate application programming interface (MIS API) 156, which may be a private interface that is exposed to the upstream clients (i.e., services 102, . . . , 104). The MIS API 156 may be used for providing one or more of the following functionalities: (a) sending a message asynchronously to an instance (the API call will return as soon as the message is queued for delivery); (b) obtaining the current status for a message, the reply document from the recipient (if the reply has been received from the target), and exception message and stack trace (if the message failed) (the API call will return its response immediately so callers can implement asynchronous polling for replies to commands); (c) obtaining the reply to a command using long-polling (this method does not return until there is a reply to the command, and the method can timeout if there is no reply sent back to the caller before the timeout period expires); and (d) marking a message as cancelled (this functionality will prevent deliveries of the message to the target instance if the message has not already been delivered and it will also prevent deliveries of responses back to the caller in the future).

The Message Delivery Service (MDS) 114 may comprise suitable circuitry, interfaces, logic and/or code, and may be used to deliver commands to downstream clients 128 (including clients running in the public cloud or in a private cloud) and to enable the downstream clients 128 to upload replies to commands or messages (e.g., received from the upstream clients such as services 102, . . . , 104). In an example embodiment, the MDS 114 may use a separate application programming interface (MDS API) 158, which may be a private interface that is exposed to the upstream clients (i.e., services 102, . . . , 104). The MDS API 158 may be used for providing one or more of the following functionalities: (a) obtaining the messages that are waiting for a particular instance via long-polling queries (this method may not return until there is a message for the instance, and the method can timeout if there is no message sent to the instance before the timeout period expires); and (b) sending a reply back to the service that sent the message indicating status of the message delivery (i.e., succeeded, failed), the response document if the message was successfully processed, and exception information if message processing or delivery failed.

The Setup and Maintenance Service (SMS) 108 may comprise suitable circuitry, interfaces, logic and/or code, and may be used for viewing and control of one or more components of the IMS 106. The SMS 108 can be used to provide one or more of the following functionalities: (a) enabling or disabling delivery of messages that are associated with a particular function or have a particular topic prefix; (b) obtaining a list of the notification queues 120 owned by the IMS 106 and the number of messages waiting in each queue; (c) providing a list of messages that are waiting to be dispatched to their target instance; (d) deleting a message that is stuck waiting to be delivered to its target (one or more messages, including all messages, waiting to be delivered to the instance can be deleted); (e) obtaining one or more configuration values for one or more components of the IMS 106 (configuration values can include one or more of the following: whether the VMS 110 is enabled, VMS 110 call rate, throttle limit for downstream clients, throttle limit for upstream clients, and whether the IMS 106 is enabled); and (f) setting a particular configuration value.

The Validation and Monitoring Service (VMS) 110 may comprise suitable circuitry, interfaces, logic and/or code and may be operable to use the MIS 112 and MDS 114 as an ordinary client to gather error rate and latency metrics for one or more API methods/calls used within the IMS 106 (including metrics associated with usage of the notification queues 120), and upload the collected data/metrics to network storage or a database (e.g., storage 126). In an example embodiment, the VMS 110 may run continuously and may detect issues with the IMS 106 even during periods of low usage (when it may be difficult to detect problems with customer traffic). The VMS 110 may function as both the upstream client and downstream target for the messages it sends, so it can also gather end-to-end latency metrics for message delivery from the time the upstream client creates a message until the time the downstream client receives it. Similarly, the VMS 110 may be operable to gather end-to-end metrics for replies from when the downstream client sends the reply to when the upstream client receives it. In this regard, the VMS 110 may continually post messages to the MIS 112, receive messages them from the MDS 114, replies to the messages, and receives the replies.

In operation, the upstream clients (i.e., services 102, . . . , 104) can use the MIS 112 (and the MIS API 156) to send messages (e.g., message 101) to one or more of the VMIs 130, . . . , 132. The downstream clients 128, such as the configuration agents 134, . . . , 136 can retrieve the messages from the MDS 114 (and using the MDS API 158) via, for example, long-polling queries.

Figure 3:
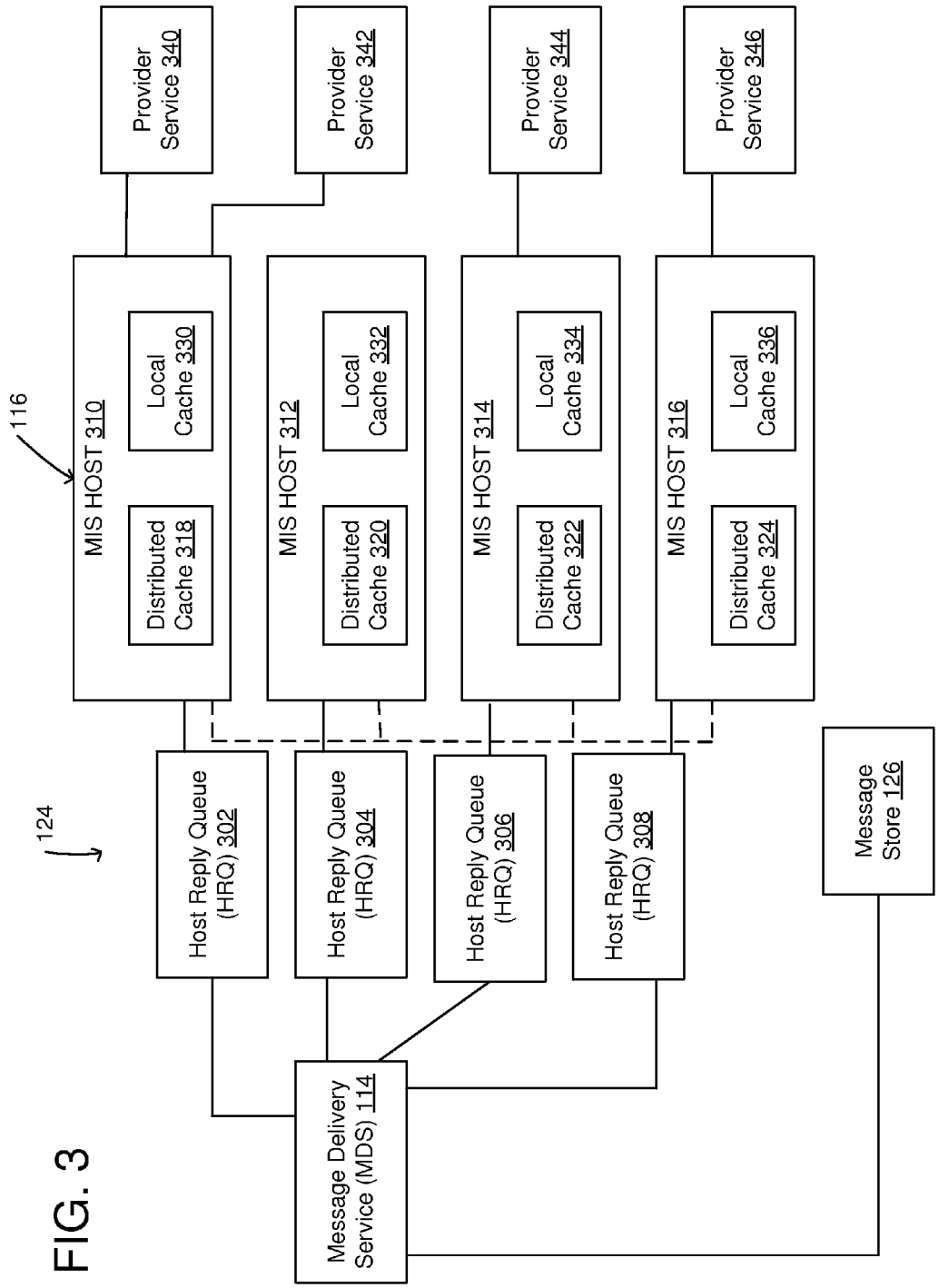
FIG. 3 is a block diagram of instance messaging service components used for sending messages to upstream clients, in accordance with an embodiment of the disclosure.

An upstream client (e.g., service 102) can send a message 101 to the IMS 106 (e.g., using the MIS API 156 and making a call to send a message), the MIS 112 can store the incoming message 101 into the message store 126. A notification of the received message (e.g., message notification 150) can be queued in, e.g., the message queues 122. The notification is then communicated to each of the MDS hosts 118, informing the hosts 118 of the new message 101. A target instance identification (ID) 105 can also be communicated with the message 101 (or made part of the message 101). Each of the MDS hosts 118 can use the target instance ID 105 to check whether the target instance for the message 101 is currently connected. If the target instance (e.g., one or more of the VMIs 130, . . . , 132) is connected, then the message 101 is retrieved from the message store 126, the message state (e.g., 159) is updated and saved to the message store 126, and then the message 101 is delivered to the target instance (e.g., VMI 130). The state information 159 may include delivery/status state information for incoming messages (e.g., 101) as well as replies to such messages (e.g., reply 154). The reply 154 may be received from the target instance and may be stored in the message store 126 (a delivery scheme for replies is illustrated in FIG. 3 and described herein below). The reply 154 is ultimately communicated to the service communicating the original message 101. The reply 154 may include multiple replies to a single message 101 (e.g., multiple status updates for a command being executed by an instance, multiple result outputs from executing a command by the instance, and so forth). The message 101, reply 154 and/or state information 159 within the message store 126 may be merged and stored in a single table (or record) within the store 126.

In instances when the message 101 is sent to a target instance that is not connected to any of the MDS hosts 118, processing of the message may be performed as follows. When the target instance (e.g., VMI 130) calls the MDS API 158 to receive messages, the corresponding MDS host (of the hosts 118) checks whether there are any undelivered messages for the target instance VMI 130 (e.g., by checking whether there are any notifications in the message queues 122 for undelivered messages). If there are undelivered messages, they are returned to the VMI 130 (e.g., retrieved from the message store 126). If there are no undelivered messages, a continuation for the API call may be stored into a map that uses the instance ID (i.e., the instance ID of VMI 130) as a key, and the API call can return. Since the continuation has not been completed, the connection may remain open until either a message is received for the target instance (i.e., VMI 130) and subsequently delivered or the connection times out. The continuation may then be removed from the map when the connection closes. A more detailed description of sending replies is illustrated in FIG. 3, and sending messages is illustrated in FIGS. 2 and 4A-4C.

Figure 2:
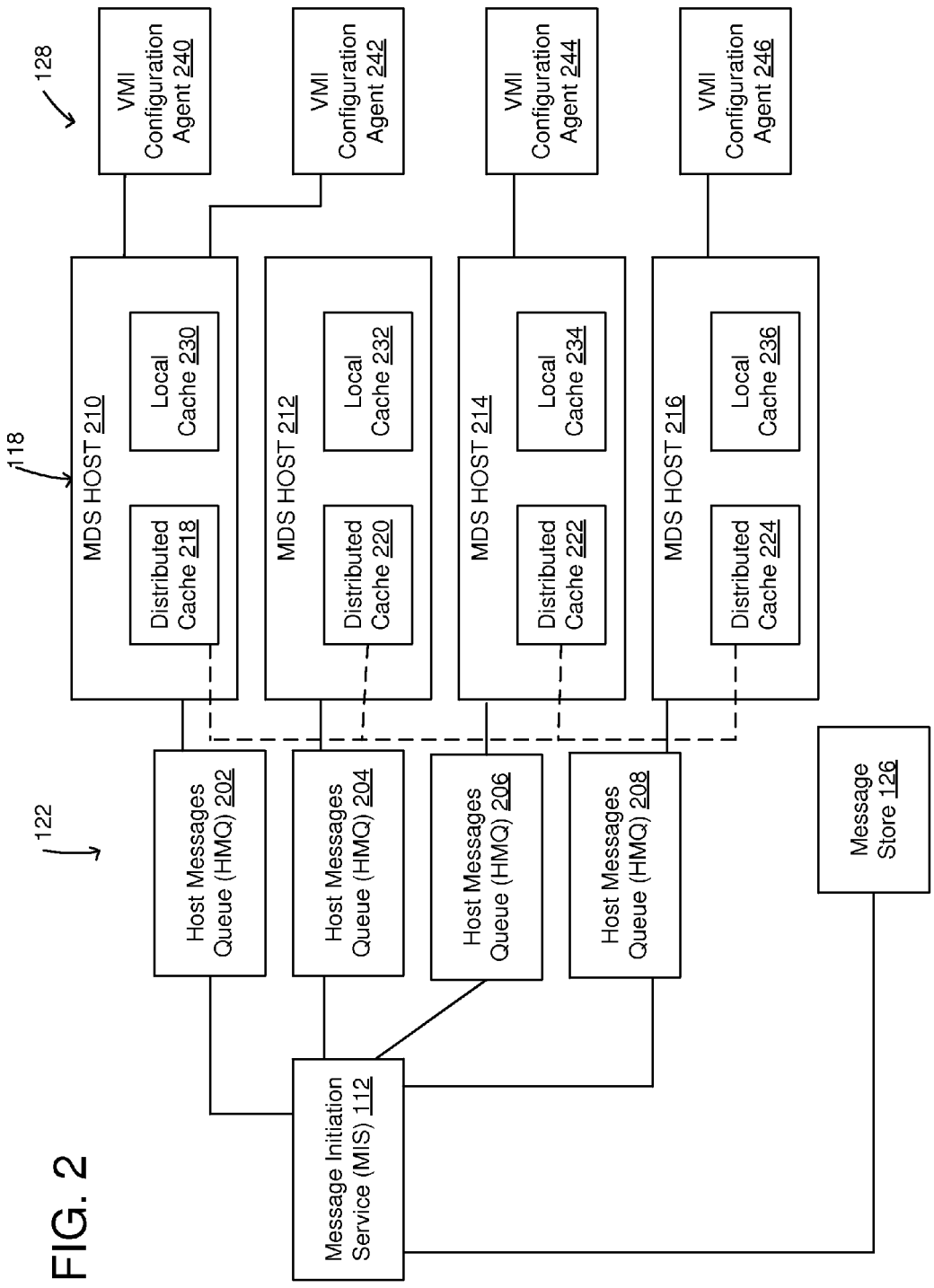
FIG. 2 is a block diagram of instance messaging service components used for sending messages to downstream clients, in accordance with an embodiment of the disclosure.

FIG. 2 is a block diagram of instance messaging service components used for sending messages to downstream clients, in accordance with an embodiment of the disclosure. Referring to FIG. 2, the MIS 112 can be used to initiate a message exchange between a service (e.g., 102) and a VMI (e.g., VMI 130). The message (e.g., 101) from service 102 can be stored in the message store 126, while a notification (e.g., 150) can be stored in the message queues 122. The message queues 122 can include host message queues (HMQs) 202-208, which may be coupled to corresponding MDS hosts 210-216 (forming the MDS hosts 118). Each of the MDS hosts 210-216 can be coupled to one or more VMI configuration agents, such as configuration agents 240-246 (which may be similar to configuration agents 134-136 in FIG. 1).

Message delivery by the IMS 106 may also use a combination of local and distributed caches to reduce the load on the message store 126 to a small multiple of the actual message delivery rate instead of the query rate. More specifically, each of the MDS hosts 210-216 may comprise a distributed cache (e.g., 218-224) and a local cache (e.g., 230-236), respectively. The HMQs 202-208 may be used to store the message notification, the distributed cache 218-224 may be used to store a message ID and time for the last delivered message for each target VMI/agent, the local cache 230-236 may be used to store the message ID and time for the last undelivered message queued for each target VMI/agent, and the message store 126 may be used as the authoritative message data store.

There may be at least two scenarios for delivering a message to its target instance. Under a first example scenario, the target VMI may already be connected to an MDS host (e.g., one of the hosts 210-216) when the queued message notification is delivered (e.g., into the HMQs 202-208). Alternatively, under a second example scenario, there may be one or more messages waiting to be delivered when the target instances calls the MDS API 158 to obtain undelivered messages. More detailed flowcharts of example message communication processing are illustrated in FIGS. 4A-4C.

Figure 4A:
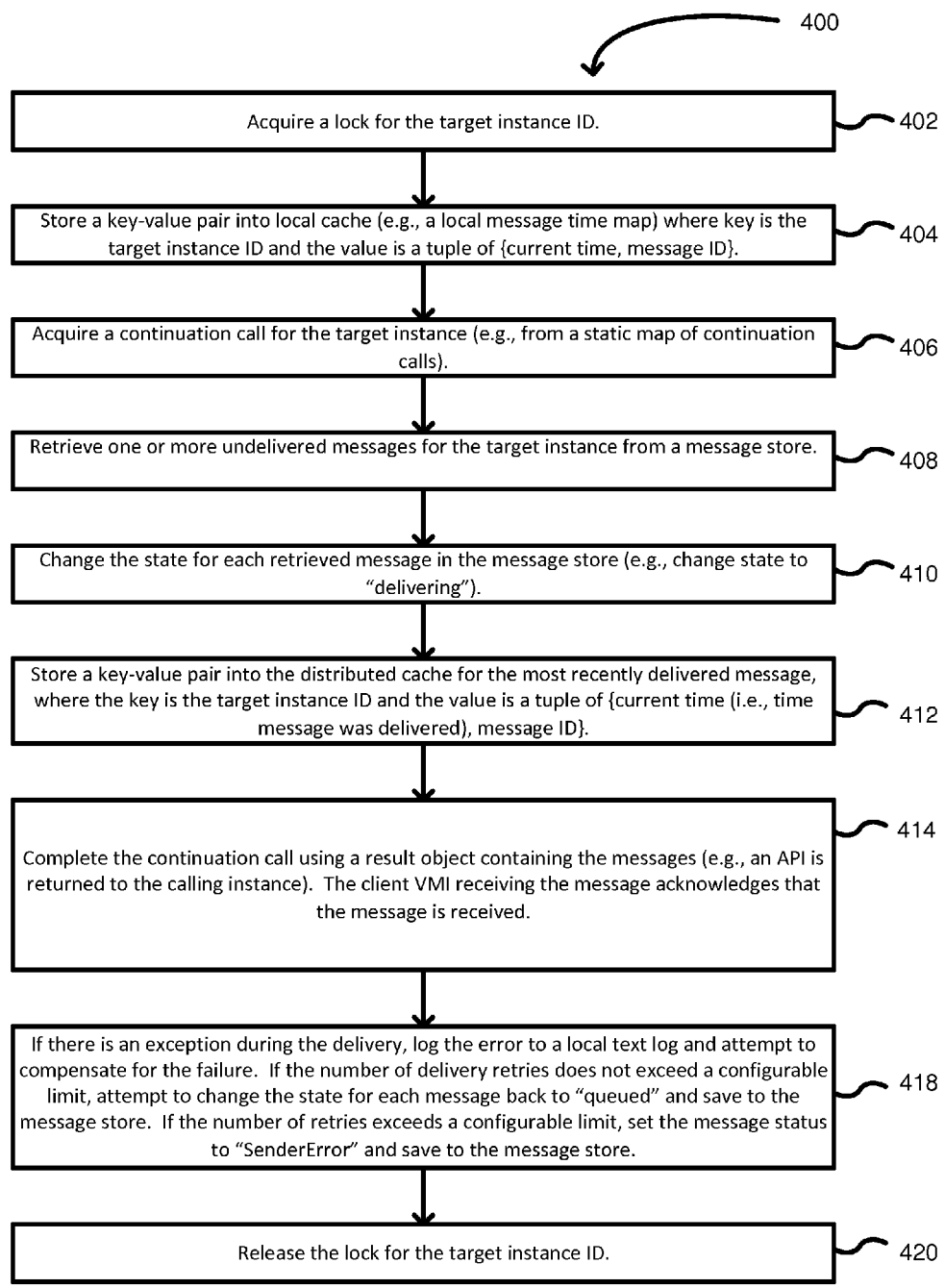
FIGS. 4A-4C are flowcharts of example methods of communicating messages from a service to at least one virtual machine instance, in accordance with an embodiment of the disclosure.
Figure 4B:
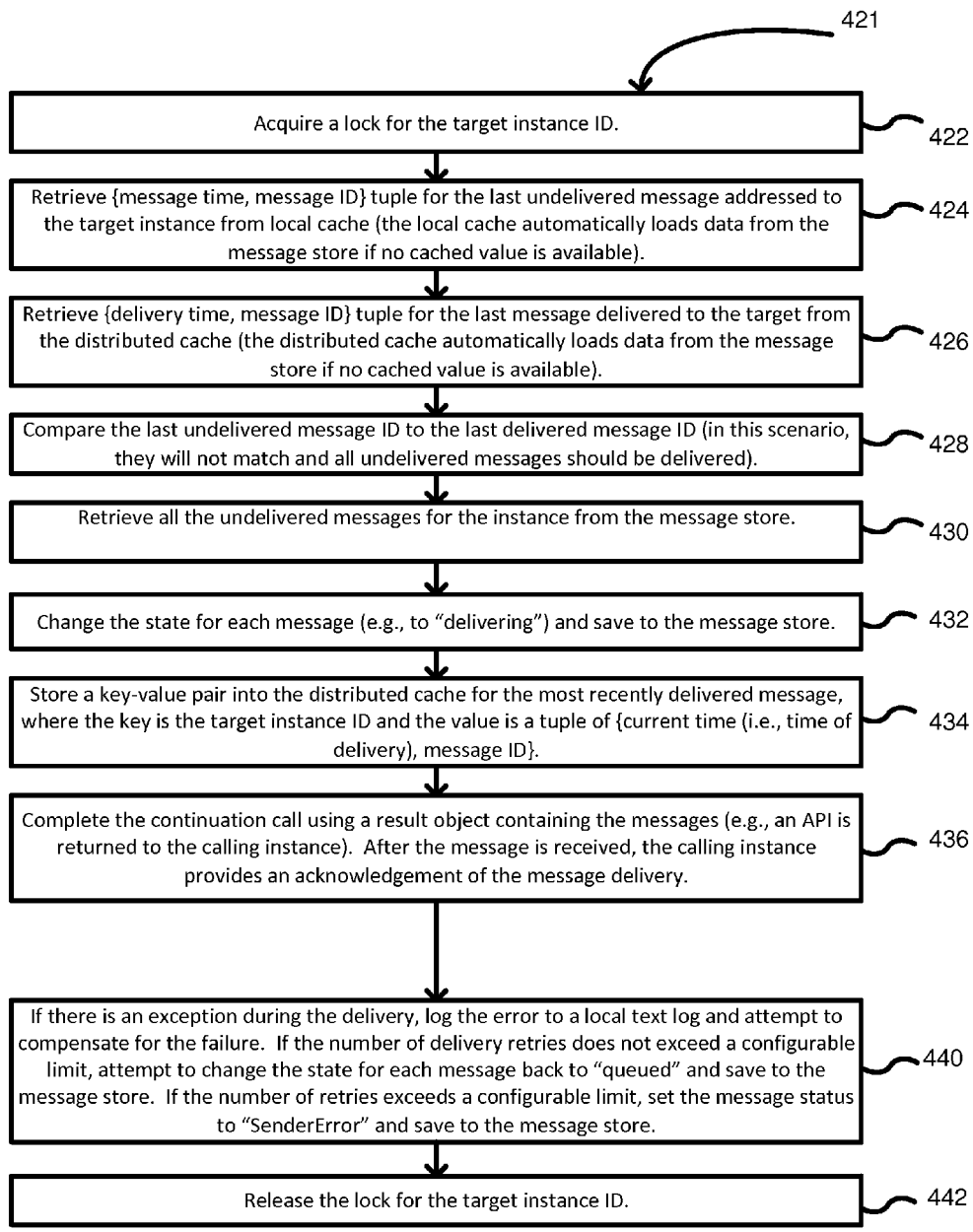
Figure 4C:
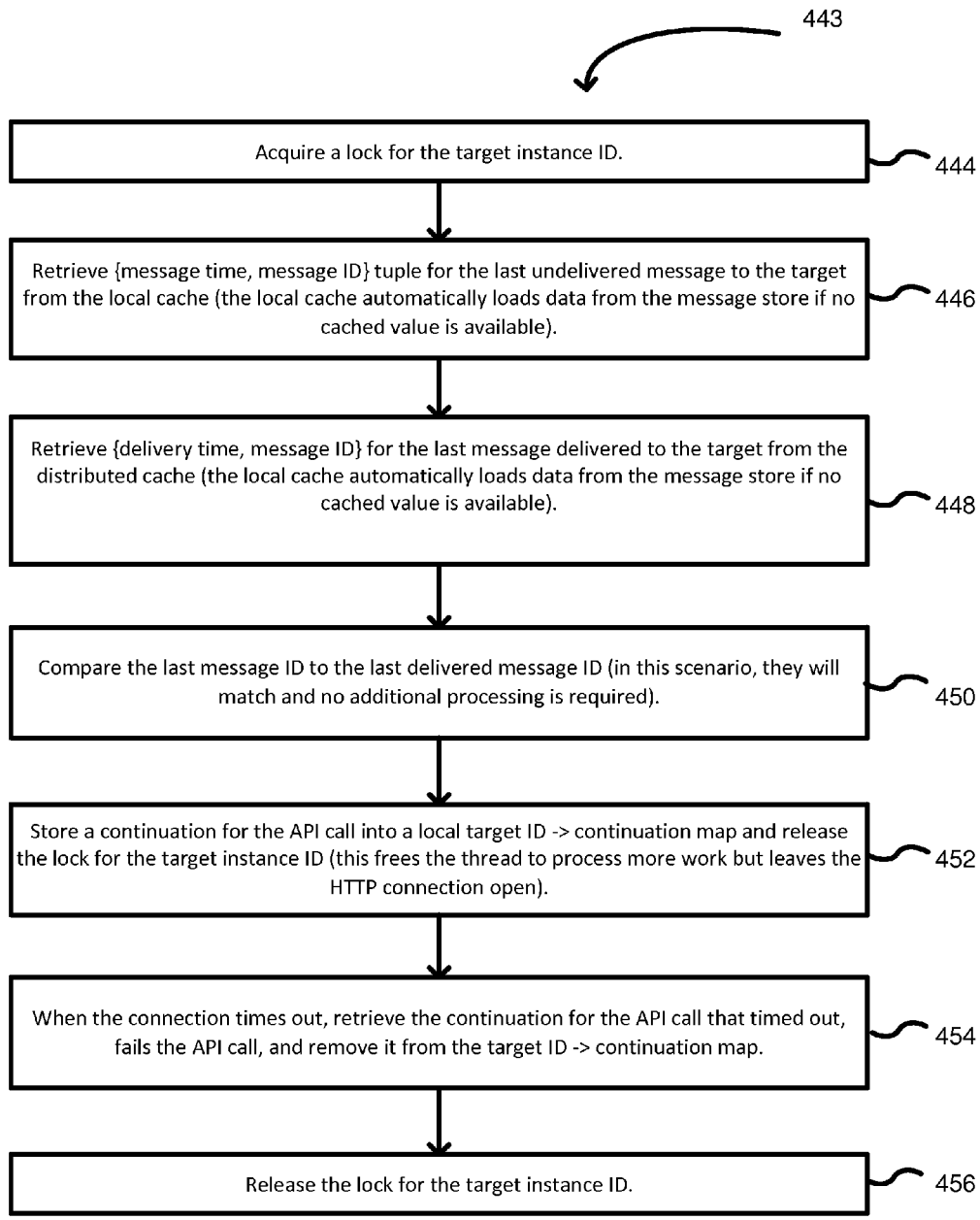

FIGS. 4A-4C are flowcharts of example methods of communicating messages from a service to at least one virtual machine instance, in accordance with an embodiment of the disclosure. FIG. 4A illustrates example steps performed (e.g., within an MDS host) in instances when the target VMI is already connected in a long-poll call to an MDS host (e.g., via the MDS API 158) when a message notification arrives. Referring to FIGS. 1-2 and 4A, the example method 400 may start at 402, when a lock for the target instance ID may be acquired. For example, MDS host 210 may acquire a lock for the VMI associated with VMI configuration agent 240. At 404, the IMS 106 (e.g., the MDS host 210) may store a key-value pair into the local cache 230 (which can include a local message time map), where the key is the target instance ID and the value may be a tuple of {current time, received message ID}.

At 406, the MDS host 210 can acquire a continuation call for the target instance (e.g., from a static map of continuation calls). At 408, the MDS host 210 can retrieve one or more undelivered messages (e.g., 101) for the target instance from the message store 126. At 410, the MDS host 210 can change the state (e.g., 159) for each retrieved message in the message store 126 (e.g., change state to "delivering"). At 412, the MDS host 210 can store a key-value pair into the distributed cache 218 for the most recently delivered message, where the key is the target instance ID and the value is a tuple of {current time (i.e., time message was delivered), delivered message ID}. At 414, the MDS host 210 may complete the continuation call using, e.g., a result object containing the messages (e.g., an MDS API call is returned to the calling instance/agent). The client VMI receiving the message provides an acknowledgement that the message is received. At 418, if there is an exception during the message delivery, the MDS host 210 may log the error to a local text log file and attempt to compensate for the failure. For example, if the number of delivery retries does not exceed a configurable limit, the MDS host 210 may attempt to change the state 159 for each message back to "queued" and save the state (and/or the message) back in the message store 126. In instances when the number of retries exceeds a configurable limit, the MDS host 210 may set the message status 159 to, e.g., "SenderError" and save the state (and/or the message) back to the message store 126. At 420, the MDS host 210 may release the lock for the target instance ID.

FIG. 4B illustrates example steps performed (e.g., within an MDS host) in instances when there are messages waiting to be delivered when the target VMI/agent (e.g., agent 240) uses the MDS API 158 to receive/obtain undelivered messages. Referring to FIGS. 1-2 and 4B, the example method 421 may start at 422, when a lock for the target instance ID may be acquired. For example, MDS host 210 may acquire a lock for the VMI associated with VMI configuration agent 240. At 424, the MDS host 210 may retrieve {message time, message ID} tuple for the last undelivered message addressed to the target instance from the local cache 230 (the local cache may automatically load data from the message store if no cached value is available). At 426, the MDS host 210 may retrieve {delivery time, message ID} tuple for the last message delivered to the target instance (or agent 240) from the distributed cache 218 (the distributed cache may automatically load data from the message store 126 if no cached value is available). At 428, the MDS host 210 may compare the last undelivered message ID to the last delivered message ID (in this scenario, they will not match and all undelivered messages may be delivered to the VMI of agent 240).

At 430, the MDS host 210 may retrieve the undelivered messages for the instance (e.g., the VMI associated with configuration agent 240) from the message store 126. At 432, the MDS host 210 may change the state 159 for each retrieved message (e.g., to "delivering") and save the state in the message store 126. At 434, the MDS host 210 may store a key-value pair into the distributed cache 218 for the most recently delivered message, where the key is the target instance ID and the value is a tuple of {current time (i.e., time of delivery), message ID of delivered message}. At 436, the MDS host 210 may complete the continuation call using a result object containing the messages (e.g., an API is returned to the calling instance). After the message is received, the calling instance provides an acknowledgement that the message is received. At 440, in instances when there is an exception during the delivery, the MDS host 210 may log the error to a local text log and attempt to compensate for the failure. In instances when the number of delivery retries does not exceed a configurable limit, the MDS host 210 may attempt to change the state 159 for each undelivered message back to "queued" and save the state (and/or the message) to the message store 126. In instances when the number of retries exceeds a configurable limit, the MDS host 210 may set the message status 159 to "SenderError" and save the state (and/or the message) to the message store 126. At 442, the MDS host 210 may release the lock for the target instance ID.

FIG. 4C illustrates example steps performed (e.g., within an MDS host) in instances when there are no waiting messages when the target VMI/agent (e.g., agent 240) uses the MDS API 158 to receive/obtain undelivered messages. Referring to FIGS. 1-2 and 4C, the example method 443 may start at 444, when a lock for the target instance ID may be acquired. For example, MDS host 210 may acquire a lock for the VMI associated with VMI configuration agent 240. At 446, the MDS host 210 may retrieve {message time, message ID} tuple for the last undelivered message addressed to the target instance from the local cache 230 (the local cache may automatically load data from the message store if no cached value is available). At 448, the MDS host 210 may retrieve {delivery time, message ID} tuple for the last message delivered to the target instance (or agent 240) from the distributed cache 218 (the distributed cache may automatically load data from the message store 126 if no cached value is available). At 450, the MDS host 210 may compare the last undelivered message ID to the last delivered message ID (in this scenario, they will match and no additional processing is required). At 452, the MDS host may store a continuation for the API call into a local target ID→continuation map and release the lock for the target instance ID (this frees the thread to process more work but leaves the HTTP connection open). At 454, when the connection times out, the MDS host 210 may retrieve the continuation for the API call that timed out, may fail the API call, and remove it from the target ID→continuation map. At 456, the MDS host 210 may release the lock for the target instance ID.

FIG. 3 is a block diagram of instance messaging service components used for sending messages to upstream clients, in accordance with an embodiment of the disclosure. Referring to FIG. 3, the MDS 114 can be used to deliver replies (e.g., reply 154) from the downstream clients 128 to one or more of the provider services (102, . . . , 104 or 340, . . . , 346). The reply (e.g., 154) from an instance (e.g., VMI 130) can be stored in the message store 126, while a notification (e.g., reply notification 152) can be stored in the reply queues 124. The reply queues 124 can include host reply queues (HRQs) 302-308, which may be coupled to corresponding MIS hosts 310-316 (forming the MIS hosts 116). Each of the MIS hosts 310-316 can be coupled to one or more services, such as provider services 340, . . . , 346 (which may be similar to services 102, . . . , 104 in FIG. 1).

Reply delivery by the IMS 106 may also use a combination of local and distributed caches to reduce the load on the message store 126 to a small multiple of the actual message delivery rate instead of the query rate. More specifically, each of the MIS hosts 310-316 may comprise a distributed cache (e.g., 318-324) and a local cache (e.g., 330-336), respectively. The HRQs 302-308 may be used to store the reply notification, the distributed cache 318-324 may be used to store a reply ID and time for the last delivered reply for each service, the local cache 330-336 may be used to store the reply ID and time for the last undelivered reply queued for each service, and the message store 126 may be used as the authoritative reply data store. Additionally, functionalities similar to those described in FIGS. 4A-4C may be performed by one or more of the MIS hosts 310-316 when delivering replies to the provider services 340-346. A reply may be sent to a single service, and different replies can be sent to different services. Furthermore, multiple replies can be sent from a single VMI in response to a single message.

Figure 5:
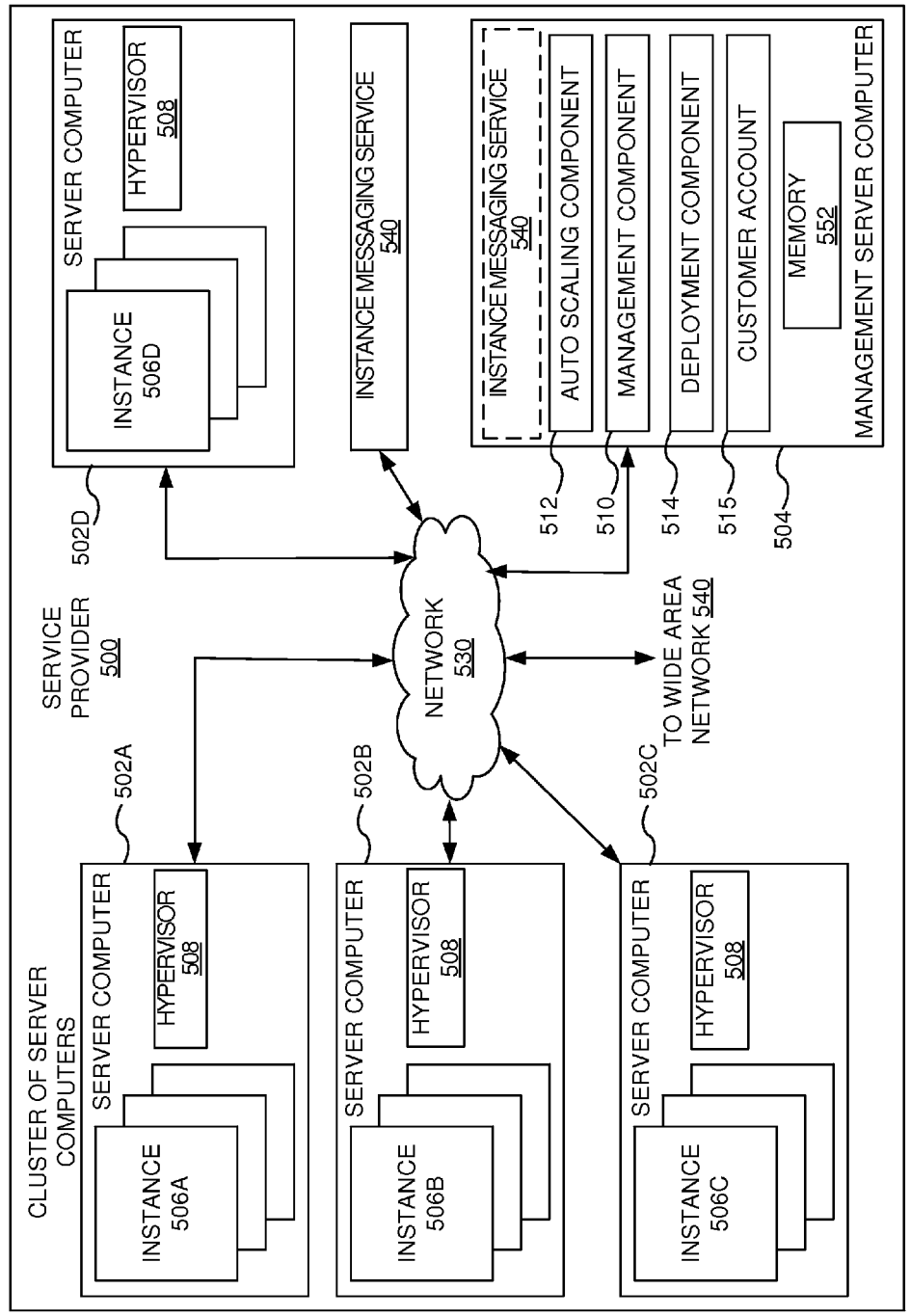
FIG. 5 is an example system diagram showing a plurality of virtual machine instances running in a service provider environment, using an instance messaging service, in accordance with an example embodiment of the disclosure.

In reference to FIGS. 2-3, the MDS hosts 118 may scale based on the total number of instances receiving messages, while the MIS hosts 116 can scale based on the number of messages being sent FIG. 5 is an example system diagram showing a plurality of virtual machine instances running in a service provider environment, using an instance messaging service, in accordance with an example embodiment of the disclosure. More specifically, FIG. 5 is a computing system diagram of a network-based service provider 500 that illustrates one environment in which embodiments described herein can be used. By way of background, the service provider 500 (i.e., the cloud provider) is capable of delivery of computing and storage capacity as a service to a community of end recipients (e.g., tenants or customers). The service provider 500 may be the same as the service provider 100 illustrated in FIG. 1.

In an example embodiment, the service provider 500 can be established for an organization by or on behalf of the organization. That is, the service provider 500 may offer a "private cloud environment." In another embodiment, the service provider 500 supports a multi-tenant environment, wherein a plurality of customers operate independently (i.e., a public cloud environment). Generally speaking, the service provider 500 can provide the following models: Infrastructure as a Service ("IaaS"), Platform as a Service ("PaaS"), and/or Software as a Service ("SaaS"). Other models can be provided. For the IaaS model, the service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the service provider platform without the cost of buying and managing the underlying hardware and software. The SaaS model allows installation and operation of application software in the service provider. In some embodiments, end users access the service provider 400 using networked customer devices, such as desktop computers, laptops, tablets, smartphones, etc. running web browsers or other lightweight customer applications. Those skilled in the art will recognize that the service provider 500 can be described as a "cloud" environment.

The particular illustrated service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e., a computer) that executes applications like a physical machine. In the example, each of the server computers 502A-502D can be configured to execute a hypervisor 508 or another type of program configured to enable the execution of multiple instances 506 on a single server. For example, each of the servers 502A-502D can be configured (e.g., via the hypervisor 508) to support one or more virtual machine partitions, with each virtual machine partition capable of running a virtual machine instance (e.g., server computer 502A could be configured to support three virtual machine partitions each running a corresponding virtual machine instance). Additionally, each of the instances 506 can be configured to execute one or more applications.

Figure 6:
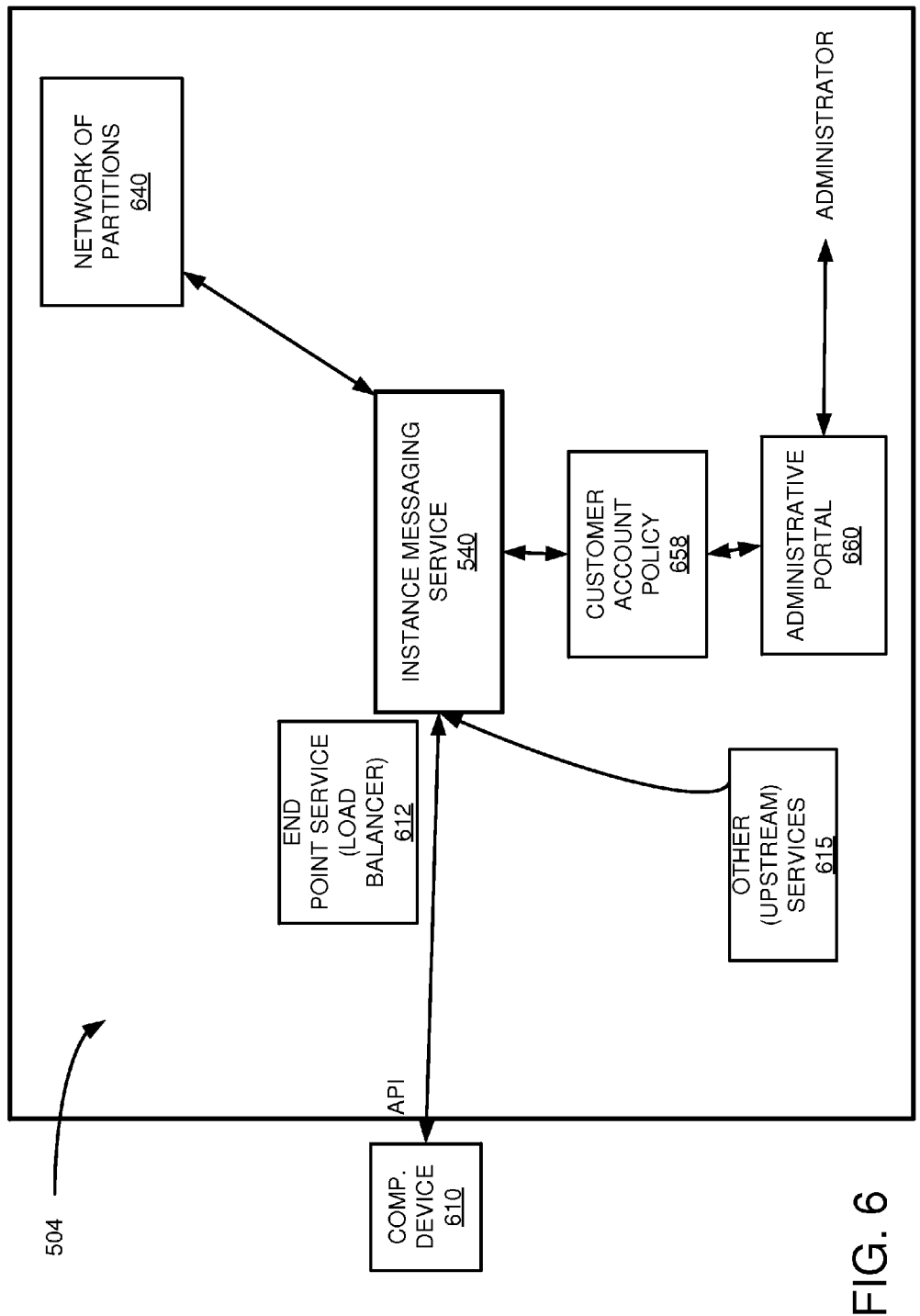
FIG. 6 shows further details of an example system including a plurality of management components associated with a control plane, which may be used to provide instance messaging according to one embodiment.

The service provider 500 may also comprise an instance messaging service 540, which may have the functionalities described herein in connection with the IMS 106. The instance messaging service 540 may be implemented as a stand-alone service within the provider 500, as a dedicated server (similar to the servers 502A-502D), as a code library within one or more of the servers 502, and/or may be implemented as part of the server computer 504 that performs management functions. For example, the instance messaging service 540 may be implemented as part of the management server 504 (as seen in FIG. 6).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

The server computer 504 can be reserved for executing software components for managing the operation of the server computers 502, the instances 506, the hypervisors 508, and/or the instance messaging service 540. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand.

The server computer 504 may further comprise memory 552, which may be used as processing memory by the instance messaging service 540. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. An instance manager can be considered part of the deployment component 514.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 530 can be utilized to interconnect the server computers 502A-502D and the server computer 504. The network 530 can include a local area network (LAN) and/or the Internet, and can be connected to a Wide Area Network (WAN) 540 so that end-users can access the service provider 500. It should be appreciated that the network topology illustrated in FIG. 5 has been simplified and that many more networks and networking devices can be utilized to interconnect the various computing systems disclosed herein.

FIG. 6 shows further details of an example system including a plurality of management components associated with a control plane, which may be used to provide instance messaging according to one embodiment. More specifically, FIG. 6 illustrates in further detail the server computer 504, which may implement the instance messaging service 540 within the multi-tenant environment of the service provider 500.

In order to access and utilize instances (such as instances 506 of FIG. 5), a customer device 610 can be used. The customer device 610 can be any of a variety of computing devices, mobile or otherwise, including a cell phone, smartphone, handheld computer, Personal Digital Assistant (PDA), desktop computer, etc. The customer device 610 can communicate with the service provider 500 through an end point (or load balancer) 612, which can be a DNS address designed to receive and process application programming interface (API) requests. In particular, the end point 612 can be a web server configured to expose an API, which may also perform load balancing functionalities. The end point/load balancer 612 may be implemented as part of the instance messaging service 540. Using the API requests, a customer device 610 can make requests to implement any of the functionality described herein or to access one or more services provided by the service provider 500, such as the instance messaging service 540. Other services 615, which can be internal to the service provider 500, can likewise make API requests to the end point 612 or otherwise access the instance messaging service 540 (e.g., to send messages and receive replies).

The instance messaging service 540 may perform the instance messaging functionalities described herein (e.g., the functionalities described in reference to the IMS 106). The IMS 440 may communicate with the device 610 (e.g., to receive new functionality requests such as delivering a message, checking for undelivered messages, and so forth), with the network of partitions 640 (e.g., to access a virtual desktop instance running on a server computer), upstream services 615, and the customer account policy document 658. The policy document 658 may be used to store one or more settings related to instance messaging functionalities associated with a customer account (e.g., customer authorizations to access one or more instances, messaging notification preferences, and other settings). The policy document 658 may be managed by an administrator (and/or the client) via the portal 660.

Figure 7:
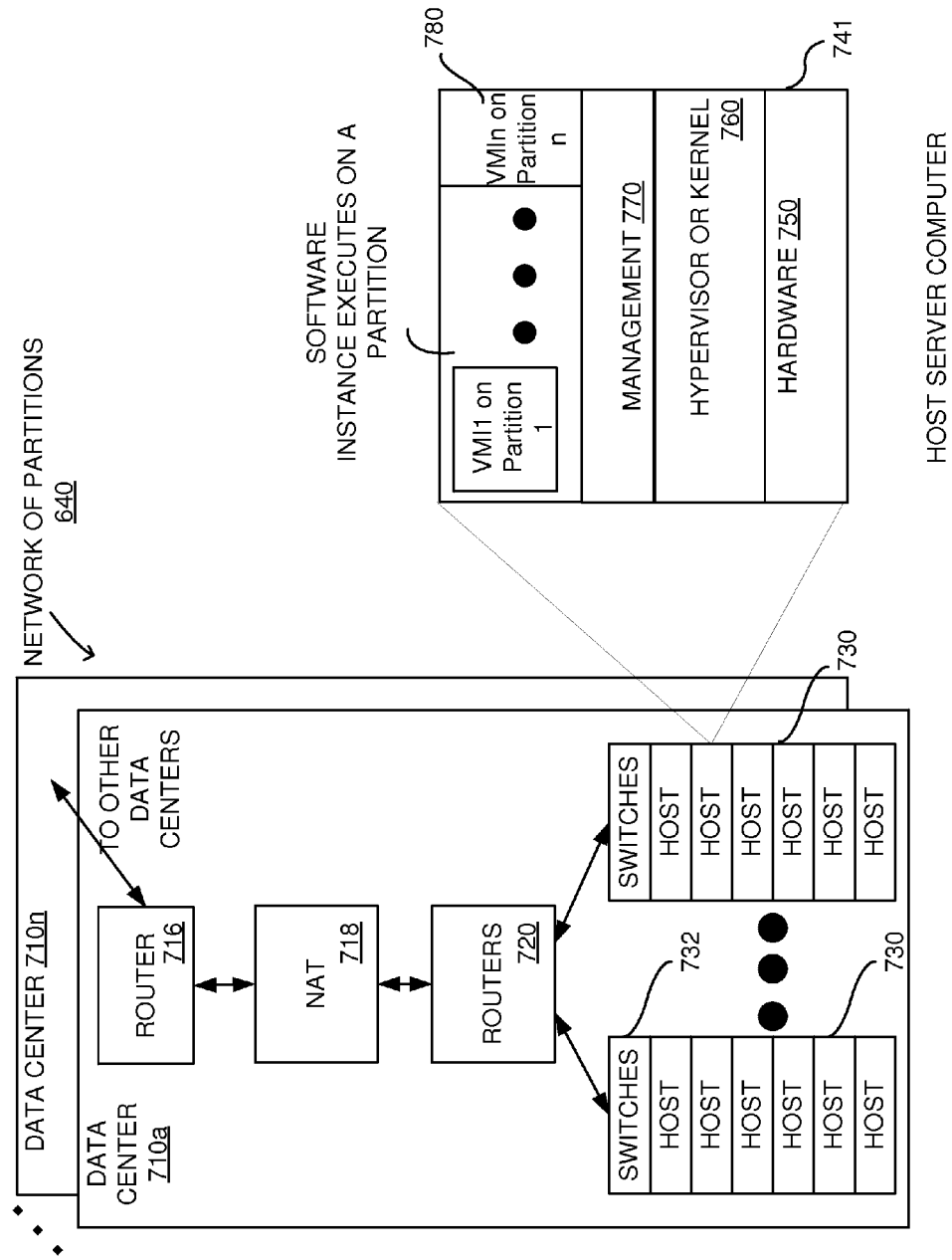
FIG. 7 shows an example of a plurality of host computers, routers, and switches—which are hardware assets used for running virtual machine instances—with the host computers having instance messaging-related functionalities that may be configured according to one embodiment.

FIG. 7 shows an example of a plurality of host computers, routers, and switches—which are hardware assets used for running virtual machine instances—with the host computers having instance messaging-related functionalities that may be configured according to one embodiment. More specifically, FIG. 7 illustrates the network of partitions 640 and the physical hardware associated therewith. The network of partitions 640 can include a plurality of data centers, such as data centers 710a, . . . , 710n, coupled together by routers, such as router 716.

The router 716 reads address information in a received packet and determines the packet's destination. If the router decides that a different data center contains a host server computer, then the packet is forwarded to that data center. If the packet is addressed to a host in the data center 710a, then it is passed to a network address translator (NAT) 718 that converts the packet's public IP address to a private IP address. The NAT 718 also translates private addresses to public addresses that are bound outside of the data center 710a. Additional routers 720 can be coupled to the NAT 718 to route packets to one or more racks 730 of host server computers. Each rack 730 can include a switch 732 coupled to multiple host server computers. A particular host server computer is shown in an expanded view at 741.

Each host 741 has underlying hardware 750. Running a layer above the hardware 750 is a hypervisor or kernel layer 760. The hypervisor or kernel layer 760 can be classified as a type 1 or type 2 hypervisor. A type 1 hypervisor runs directly on the host hardware 750 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used.

A management layer 770 can be part of the hypervisor or separated therefrom, and generally includes device drivers needed for accessing the hardware 750. The partitions 780 are logical units of isolation by the hypervisor. Each partition 780 can be allocated its own portion of the hardware layer's memory, CPU allocation, storage, etc. Additionally, each partition can include a virtual machine and its own guest operating system (e.g., VMI1 may be running on partition 1 and VMIn may be running on partition n). As such, each partition 780 is an abstract portion of capacity designed to support its own virtual machine independent of the other partitions. One or more of the VMIs (VMI1, VMIn) on partitions 780 may also execute configuration agents (e.g., 134, . . . , 136 as seen in FIG. 1).

Figure 8:
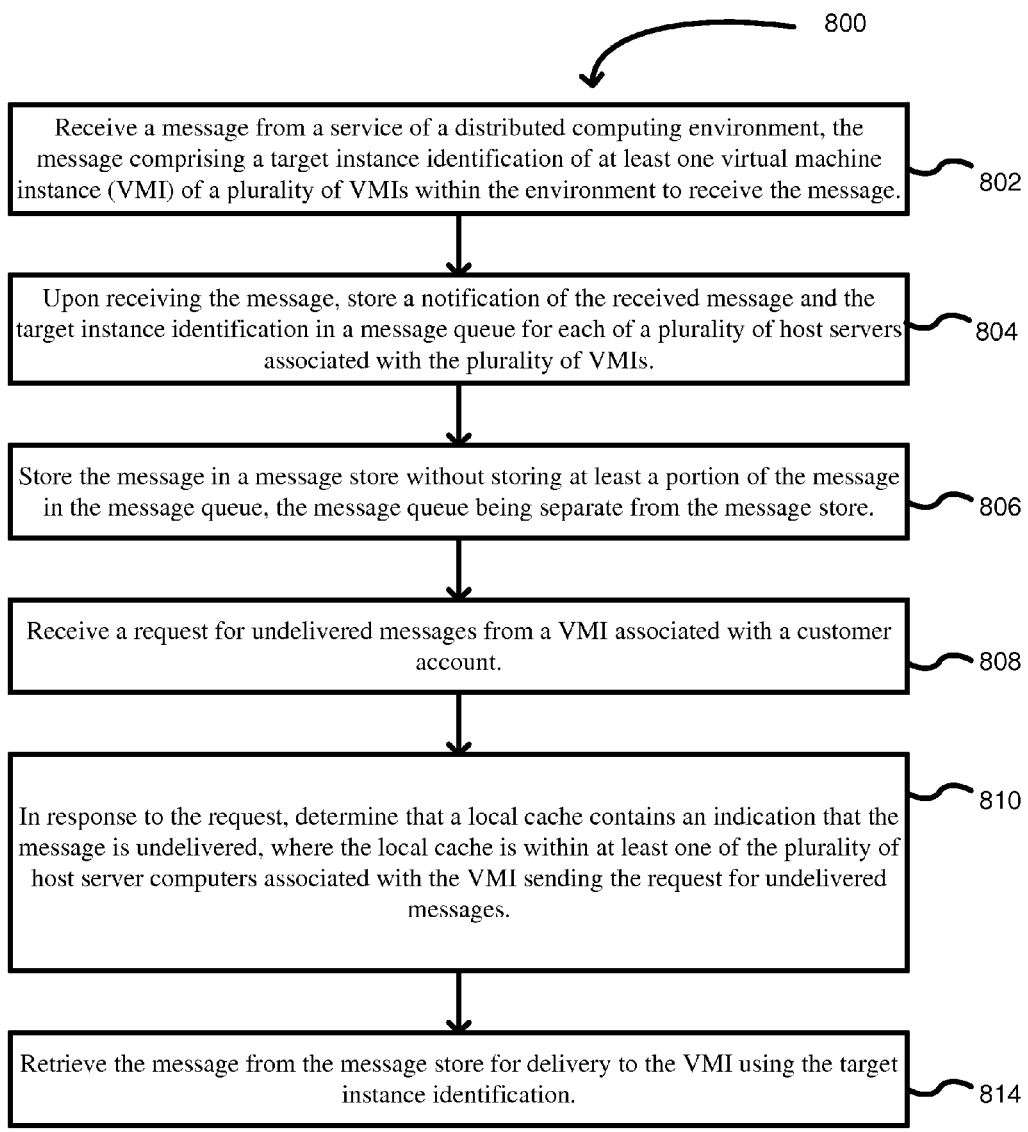
FIGS. 8-9 are flowcharts of example methods for communicating messages between a service and a virtual machine instance in a service provider environment, in accordance with an embodiment of the disclosure.
Figure 9:
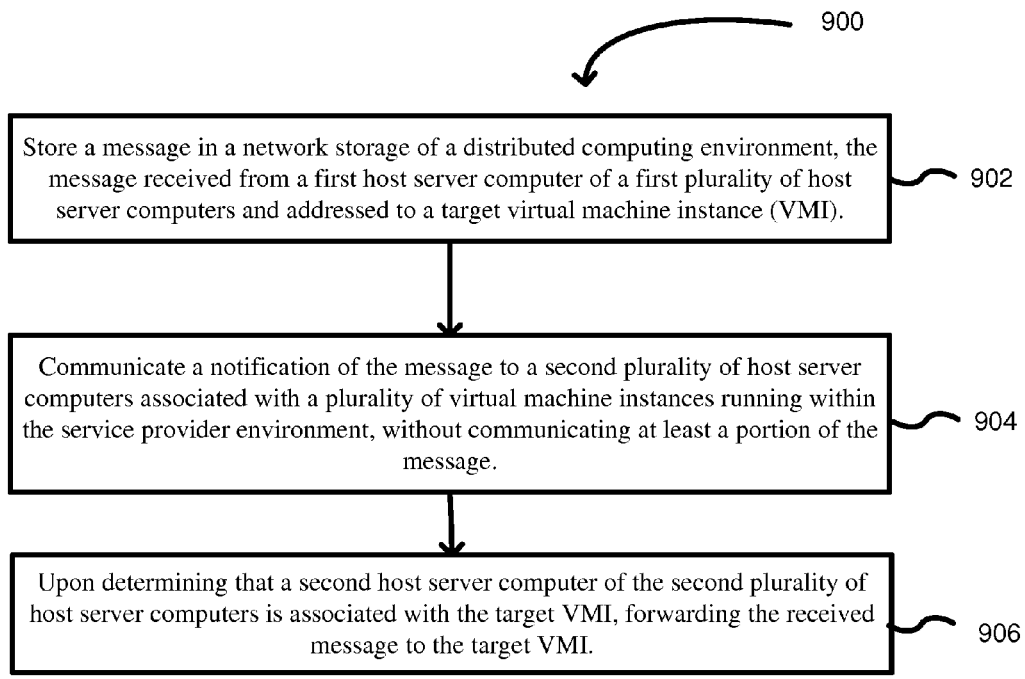

FIGS. 8-9 are flowcharts of example methods for communicating messages between a service and a virtual machine instance in a service provider environment, in accordance with an embodiment of the disclosure. Referring to FIGS. 1-3 and 8, the example method 800 may start at 802, when a message may be received from a service of a distributed computing environment. For example, the message 101 may be received from service 102 of the computing environment 100. The message 101 may include a target instance identification (e.g., target instance ID 105) of at least one virtual machine instance (e.g., VMI 130) of a plurality of VMIs within the computing environment to receive the message.

At 804, upon receiving the message, a notification of the received message and the target instance identification may be stored in a message queue for each of a plurality of host servers associated with the plurality of VMIs. For example, the IMS 106 may store a notification 150 of the received message 101 (as well as the target instance ID 105) in the message queues 122. At 806, the IMS 106 may store the message 101 in a message store (e.g., 126). The IMS 106 may store the message 101 in the message store 126 in its entirety (i.e., without storing at least a portion of the message 101 in any of the message queues 122). Additionally, the message queues 122 (as well as any of the remaining queues 120) are separate from the message store 126. At 808, the IMS 106 may receive a request for undelivered messages from a VMI associated with a customer account. For example, the MDS host 210 may receive a request (e.g., message request 128) for undelivered messages from the configuration agent 240 (the request 128 may also include an instance identification 129 of the requesting instance associated with the configuration agent 240). At 810 and in response to the request, the IMS 106 (e.g., the MDS host 210) may determine that a local cache contains an indication that the message is undelivered, where the local cache is within at least one of the plurality of host server computers associated with the VMI sending the request for undelivered messages.

At 814, the IMS 106 may retrieve the message 101 from the message store 126 for delivery to the VMI using the target instance identification 105 (i.e., the instance associated with agent 240).

Referring to FIGS. 1-3 and 9, the example method 900 may start at 902, when a message may be stored in a network storage of a distributed computing environment. For example, the message 101 may be received from a first host server computer (e.g., host 160 running service 102) of a first plurality of host server computers (e.g., 160, . . . , 162) and addressed to a target virtual machine instance (VMI) (e.g., message 101 is addressed to a VMI with a target instance ID 105). At 904, the IMS 106 may communicate a notification of the message to a second plurality of host server computers associated with a plurality of virtual machine instances running within the service provider environment. For example, a notification 150 of the received message may be stored in the HMQs 202-208 and communicated to the hosts 210-216 associated with VMI configuration agents 240-246. At 906, the IMS 106 may determine that a second host server computer (e.g., MDS host 210) of the second plurality of host server computers is associated with the target VMI (e.g., VMI of configuration agent 240), and the received message (e.g., 101) may be forwarded to the target VMI.

Figure 10:
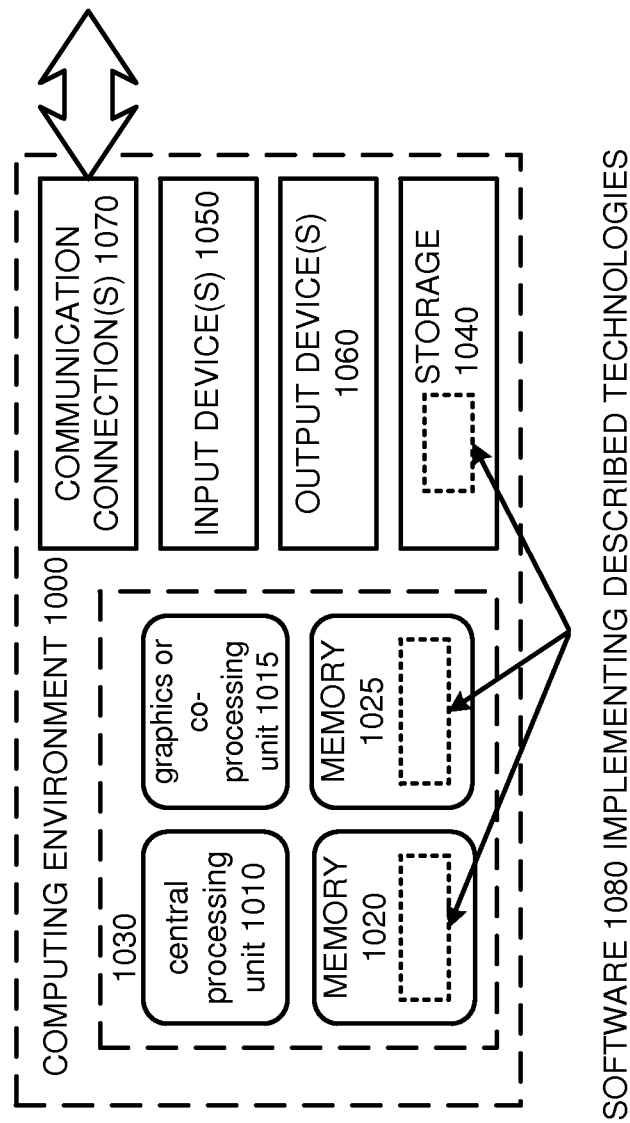
FIG. 10 depicts a generalized example of a suitable computing environment in which the described innovations may be implemented.

FIG. 10 depicts a generalized example of a suitable computing environment in which the described innovations may be implemented. Referring to FIG. 10, the computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations (e.g., functionalities) described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a customer-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method for communicating messages between a service and a virtual machine instance in a distributed computing environment, the method comprising:
    receiving a message from a service of the distributed computing environment, the message comprising a target instance identification of at least one virtual machine instance (VMI) of a plurality of VMIs within the computing environment to receive the message;
    upon receiving the message:
        storing a notification of the received message and the target instance identification in a message queue for each of a plurality of host servers associated with the plurality of VMIs; and
        storing the message in a message store without storing at least a portion of the message in the message queue, the message queue being separate from the message store;
    receiving a request for undelivered messages from a VMI associated with a customer account;
    in response to the request, determining that a local cache contains an indication that the message is undelivered, wherein the local cache is within at least one of the plurality of host server computers associated with the VMI sending the request for undelivered messages; and
    retrieving the message from the message store for delivery to the VMI associated with the customer account using the target instance identification.

2. The method according to claim 1, further comprising:
    detecting a communication priority for the message from a plurality of available communication priorities.

3. The method according to claim 2, further comprising:
    establishing a communication channel to the VMI associated with the customer account for delivery of the message, the communication channel having the detected communication priority.

4. The method according to claim 1, further comprising:
    verifying the customer account is authorized to retrieve one or more messages from the service.

5. The method according to claim 1, further comprising:
    storing, in the message store, a status indicator associated with the message.

6. The method according to claim 5, further comprising:
    updating the status indicator in the message store upon delivery of the message to the VMI associated with the customer account.

7. The method according to claim 1, further comprising:
    receiving a reply to the message from the VMI associated with the customer account;
    storing the reply in the message store, the reply identifying the service as a reply recipient;
    in response to a request for undelivered replies from the service, determining that a reply queue contains a notification of the received reply; and
    delivering the reply from the message store to the service.

8. A non-transitory computer-readable storage medium including instructions that, upon execution, cause a computer system to:
    store a message in a network storage of a distributed computing environment; the message received from a first host server computer of a first plurality of host server computers and addressed to a target virtual machine instance (VMI);
    communicate a notification of the message to a second plurality of host server computers associated with a plurality of virtual machine instances (VMIs) running within the distributed computing environment, without communicating at least a portion of the message; and
    upon determining that a second host server computer of the second plurality of host server computers is associated with the target MI, forwarding the received message to the target VMI; and
    store at a local cache within the second host server computer, a time the notification was received at the second host server computer and an identification of the message associated with the notification.

9. The non-transitory computer-readable storage medium according to claim 8, wherein the message is generated by a service of the distributed computing environment.

10. The non-transitory computer-readable storage medium according to claim 8, wherein the instructions, upon execution, further cause the computer system to:
generate the notification; and
store the notification in a message queue for each of the second plurality of host server computers.

11. The non-transitory computer-readable storage medium according to claim 8, wherein the instructions, upon execution, further cause the computer system to:
determining the target VMI is connected to the second host server computer prior to the forwarding.

12. The non-transitory computer-readable storage medium according to claim 8, wherein the instructions, upon execution, further cause the computer system to:
store at the local cache within the second host server computer, an identification of the target VMI.

13. The non-transitory computer-readable storage medium according to claim 8, wherein the instructions, upon execution, further cause the computer system to:
upon delivery of the message to the target VMI, store at a distributed cache, within the second host server computer, a time the message was delivered to the target VMI and an identification of the message associated with the notification.

14. The non-transitory computer-readable storage medium according to claim 13, wherein the instructions, upon execution, further cause the computer system to:
store at the distributed cache within the second host server computer, an identification of the target VMI.

15. The non-transitory computer-readable storage medium according to claim 8, wherein the instructions, upon execution, further cause the computer system to:
receive at one of the second plurality of host server computers, a request for undelivered messages from at least one of the plurality of VMIs;
determine that there is no undelivered message available for delivery and addressed to the at least one of the plurality of VMIs; and
upon determining that there is no undelivered message available for delivery, maintain an open connection between the at least one of the plurality of VMIs and the one of the second plurality of host server computers until a new message is delivered to the at least one of the plurality of VMIs or the open connection times out.

16. A system, comprising:
a plurality of server computers coupled together through a network to form a distributed computing environment, at least a first portion of the server computers for executing virtual machine instances, and at least a second portion of the server computers for executing one or more services of the distributed computing environment;
an instance messaging service communicatively coupled to the plurality of server computers and to a network storage device, the instance messaging service operable to:
store a message received from the one or more services in the network storage device, the message identifying at least one of the virtual machine instances as a receiving instance;
in response to a request for undelivered messages from the receiving instance, determine that a message queue contains a notification of the received message; and
deliver the message from the network storage device to the receiving instance.

17. The system of claim 16, wherein the instance messaging service is further operable to:
generate the notification of the received message; and
store the notification in the message queue, the message queue being separate from the network storage device.

18. The system of claim 16, wherein the instance messaging service is further operable to:
receive a reply to the message from the receiving instance;
store the reply in the network storage device, the reply identifying at least one of the one or more services as a reply recipient;
in response to a request for undelivered replies from the at least one of the one or more services, determining that a reply queue contains a notification of the received reply; and
delivering the reply from the network storage device to the at least one of the one or more services.

19. The system of claim 18, wherein the request for undelivered replies is communicated using a long-polling query.

* * * * *